April 16, 1957 T. H. WIANCKO ET AL 2,788,654
ACCELEROMETER TESTING SYSTEM
Filed April 6, 1953 3 Sheets-Sheet 1

THOMAS H. WIANCKO &
ROBERT E. TALMO,
INVENTORS.

BY
Reed C. Lawlor
ATTORNEY.

April 16, 1957 T. H. WIANCKO ET AL 2,788,654
ACCELEROMETER TESTING SYSTEM
Filed April 6, 1953 3 Sheets-Sheet 2

THOMAS H. WIANCKO &
ROBERT E. TALMO,
INVENTORS.

BY
*Reed C. Lawlor*
ATTORNEY.

THOMAS H. WIANCKO &
ROBERT E. TALMO,
INVENTORS.

United States Patent Office 2,788,654
Patented Apr. 16, 1957

2,788,654
ACCELEROMETER TESTING SYSTEM

Thomas H. Wiancko and Robert E. Talmo, Altadena, Calif., assignors to Wiancko Engineering Company, a corporation of California Application April 6, 1953, Serial No. 347,066

23 Claims. (Cl. 73—1)

This invention relates to improvements in systems for calibrating accelerometers.

Generally speaking, accelerometers are of two types, namely, linear accelerometers and angular accelerometers. Certain accelerometers of both types are of the carrier wave type. Such accelerometers employ magnetic armatures or vanes which move in response to acceleration to vary the reluctance of one or more magnetic circuits associated therewith. The acceleration to which such an instrument is subjected is generally measured by measuring changes in impedance of one or more coils that are linked with the magnetic circuit. Certain accelerometers of the carrier wave type employ four circuits whose impedances vary in accordance with the acceleration to which the accelerometer is subjected. Two of the impedances vary in one direction while the remaining impedances vary in the opposite direction, all by equal amounts substantially proportional to the acceleration. These four impedances are connected in a bridge circuit having an input diagonal and an output diagonal. When a carrier wave of constant amplitude is supplied to the input diagonal, a modulated carrier wave appears at the outer diagonal and the degree of modulation varies with the acceleration. While the invention is described hereinbelow with particular reference to accelerometers of the carrier wave type, it will be understood that it may also be applied to accelerometers of other types.

Accelerometers are employed not only to measure acceleration, but also to detect acceleration of a part of a machine and then to control the operation of the machine in order to regulate its acceleration or operation in some predetermined manner. In either event, the output of the accelerometer must be determined, at least within specified limits, over the range of acceleration which is expected to be encountered. Normally, accelerometers are designed so that their outputs are linear with acceleration, that is, the output voltage of the accelerometer is proportional to the acceleration to which the accelerometer is subjected.

In calibrating an accelerometer, it is subjected to different values of acceleration and the corresponding values of output are determined. In practice, considerable difficulty is encountered in arranging a system in which the value of acceleration is readily controlled or determined, especially if measurements are to be made of low frequency or static accelerations. Of the methods heretofore employed for this purpose to calibrate a linear accelerometer, one of the most satisfactory has employed a spin table. In this system, a linear accelerometer is mounted at a distance from the center and with the acceleration axis of the accelerometer extending radially. In this system, the spin table is rotated at various angular velocities and each speed is determined by some suitable means. Also at each speed the response or output of the linear accelerometer is measured. The measured values of acceleration are then compared with the values calculated from the length of the radius arm and the angular velocity of the spin table. Considerable difficulty is experienced with this method because the speed of rotation of the spin table may vary and because difficulty is experienced in correlating the output of the linear accelerometer with the speed. Furthermore, because of the quadratic relationship between radial acceleration and angular velocity, small errors in the measurement of the speed of rotation produce larger errors in the calculated value of the acceleration. Consequently, this method is unreliable where testing time is to be conserved and is very time-consuming where a high degree of accuracy is required.

According to the present invention, two accelerometers are mounted on a spin table, one being a test accelerometer under investigation and the other a reference accelerometer having a known calibration. The two accelerometers are so arranged that they respond in the same way to acceleration forces that are produced by rotation of the spin table. In the best mode of practicing the invention, the two accelerometers are so arranged that they are subjected to acceleration forces which are equal to each other or at least proportional to each other as the angular velocity of the spin table is varied. In accordance with this invention, the outputs of the accelerometers are compared and correlated with the acceleration to which they are subjected. In the best mode of practicing the invention, the comparison is made by means of a subtraction circuit that is controlled jointly by the outputs of the accelerometers. Furthermore, in accordance with this invention, as the speed of rotation of the spin table is changing, a record is made which indicates the difference in the outputs of the two accelerometers as a function of the value of the acceleration to which the accelerometers are subjected.

Various novel features of this invention, together with various objects and advantages thereof, will be understood from the following description of specific embodiments thereof when read in connection with the accompanying drawings wherein:

Fig. 5 is a partial wiring diagram of an alternative form of the invention;

Figure 1:
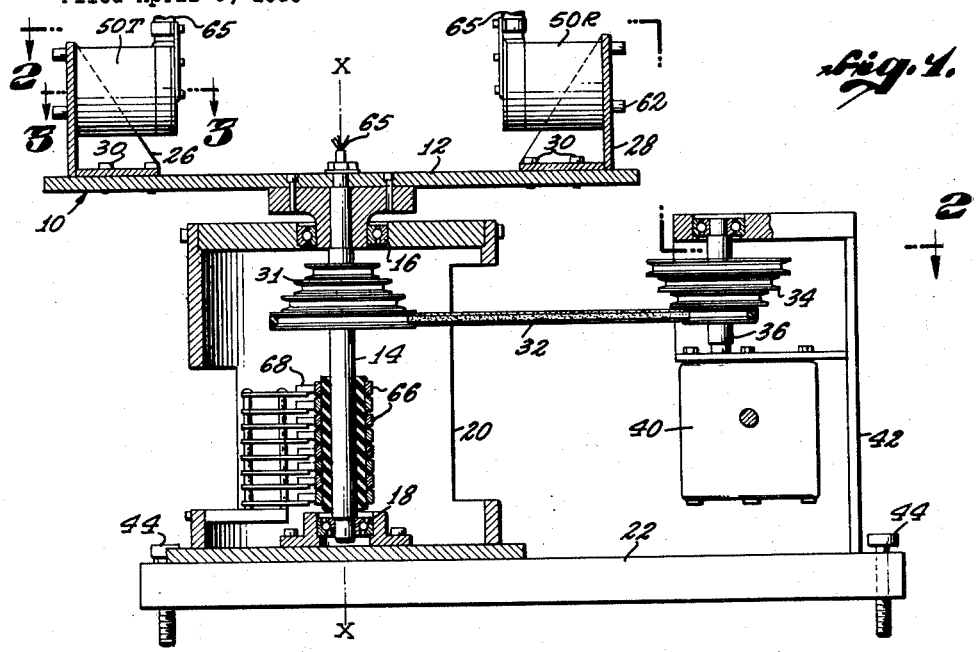
Figure 1 is a vertical cross-sectional view of apparatus embodying the invention.
Figure 2:
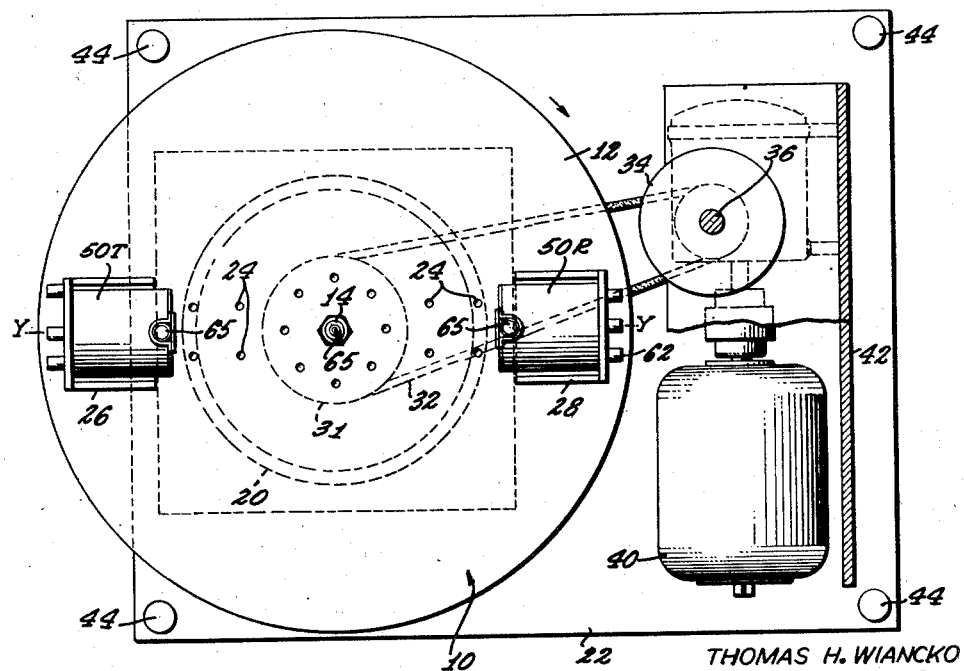
Fig. 2 is a plan view of the apparatus of Fig. 1.
Figure 4:
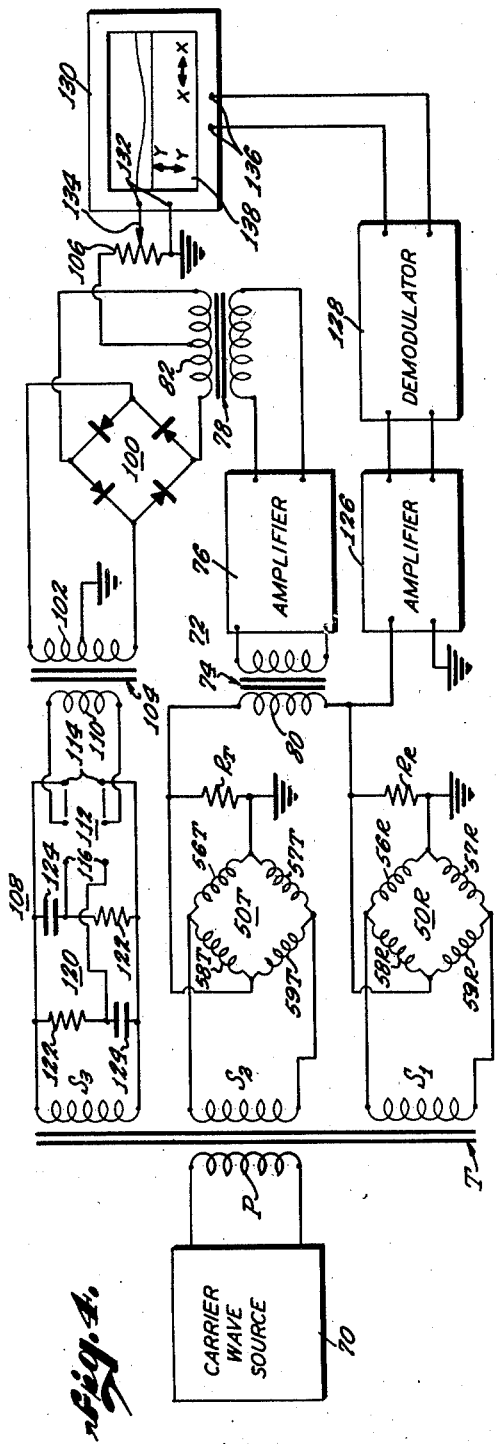
Fig. 4 is a diagram of electrical and recording apparatus employed in this invention.

Referring to the drawings and particularly to Figs. 1 and 2, there is illustrated an improved spin table employing this invention, while in Fig. 4 there is illustrated electrical apparatus employed for calibrating an accelerometer with the spin table.

The spin table 10 comprises a rigid rotatable member 12 in the form of a circular spin plate which is rigidly secured to the upper end of a hollow tubular vertical shaft 14 rotatable in bearings 16 and 18 carried by a support 20 that is secured to a stationary base 22. The rotatable plate is provided with a series of pairs of mounting holes 24. The two lines of holes are parallel and are symmetrically arranged about the axis X—X of rotation of the shaft 14. Two brackets 26 and 28 are secured to the plate 14 at diametrically opposite positions by means of screws 30 that engage suitable mounting holes 24. The brackets 26 and 28, in the embodiment of the invention shown, are located at diametrically opposite positions relative to the axis X—X and are spaced equi-distantly therefrom.

The shaft 14 carries a four-step driven sheave 31 that is driven by a V-belt 32 driven by a corresponding four-step driving sheave 34 keyed to a driving shaft 36 that is driven by a gear-head motor 40. The motor 40 itself is mounted on a frame 42 that is secured to the base 22. The belt 32 is set at any desired position on the sheaves 31 and 34 to determine the full operating speed at which the driven shaft 14 is rotated. Four levelling screws 44 are arranged at the corners of the base plate 22. Unless otherwise specifically noted in this description, these screws are adjusted to set the driven shaft 14 vertical.

According to this invention, two accelerometers 50T and 50R are mounted on the brackets 26 and 28. One of the accelerometers 50T is a test accelerometer that is to be calibrated. The other accelerometer 50R is a reference accelerometer having a known calibration. In the specific embodiment of the invention illustrated in Figs. 1 and 2, the accelerometers are of the linear type, that is, they respond to linear accelerations along their acceleration axes but do not respond substantially to accelerations in other directions. For simplicity in considering the invention, it is first assumed that the acceleration axes are collinear and radial and that their radii of rotation are equal.

Figure 3:
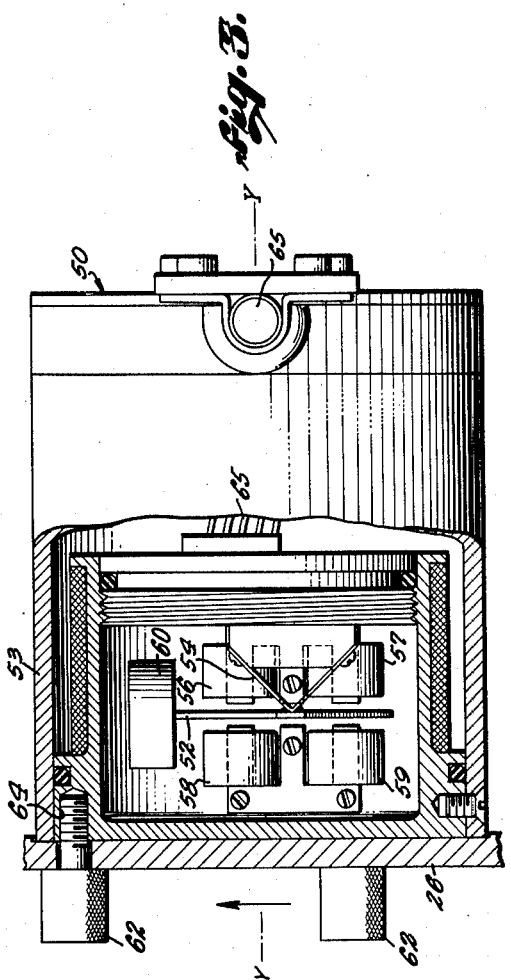
Fig. 3 is a plan view of an accelerometer, partly broken away, as seen in the direction 3—3 of Fig. 1.
Figure 3:
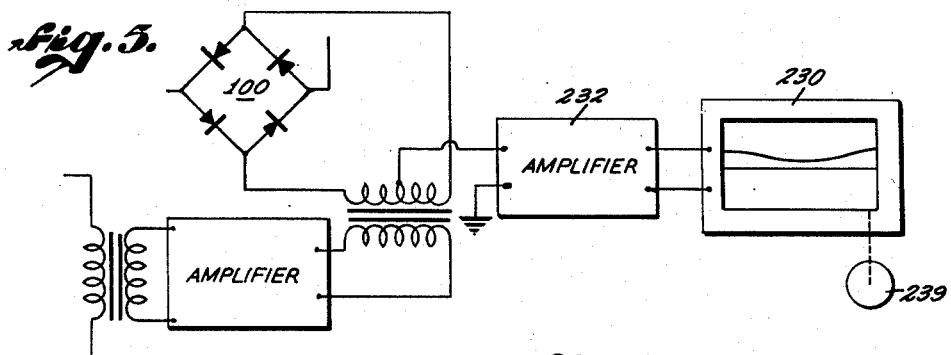

An accelerometer of the type to which the invention is applicable is illustrated in Fig. 3. This accelerometer 50 is of the type described and claimed in Patent No. 2,618,776 that issued to Thomas H. Wiancko November 18, 1952. More particularly, this accelerometer comprises a bar-shaped armature 52 resiliently suspended in a case 53 by means of a V-shaped spring 54. The armature 52 is symmetrically arranged between two E-shaped magnetic structures that carry four pickup coils 56, 57, 58, and 59 on their outer legs. An inertia member 60 secured to one end of the armature 52 dynamically unbalances the system so that the armature 52 is pivoted about the apex of the spring 54 when the accelerometer is subjected to acceleration along its acceleration axis Y—Y.

Though it is not necessary that the test and reference accelerometers be of the same type, for simplicity in considering the invention, it is assumed that in this application both accelerometers are of the type illustrated in Fig. 3. The various parts of the two accelerometers in question are distinguished herein by the suffix letters T and R which correspond respectively to the test accelerometer and reference accelerometer.

The two accelerometers 50T and 50R are secured to the brackets 26 and 28, respectively, by means of screws 62 that engage mounting holes 64 in the bases of the accelerometers. The various windings 56, 57, 58, and 59 of the two accelerometers are connected to suitable conductors 65 that extend into the driven shaft 14 and which are respectively connected to mutually insulated slip rings 66 that contact corresponding stationary brushes 68.

According to this invention, the motor 40 is energized and the outputs of the two accelerometers 50T and 50R are compared at various times while the plate 12 accelerates up to its maximum or ultimate speed thereby subjecting the accelerometers to a gradually changing static acceleration force. In Fig. 4 there is illustrated a specific form of apparatus that is employed for effecting this comparison and also for correlating the various comparisons with the respective values of acceleration to which the accelerometers at the time that the comparison is made.

Referring to Fig. 4, the windings of the two accelerometers 50T and 50R are supplied with energy from a carrier wave source 70 of 400 cps. The carrier wave source 70 is connected to a primary winding P of a transformer T having three secondary windings $S_1$, $S_2$, and $S_3$. The two accelerometers 50T and 50R are connected to the first and second secondary windings $S_1$ and $S_2$ respectively and a phase control circuit 108 is connected to the third secondary winding $S_3$ all as more fully described hereinbelow.

The windings 56R, 57R, 58R and 59R of the reference accelerometer are connected as a "Wheatstone" bridge, having a diagonal input across the junctions between the windings 56R and 58R and between the windings 57R and 59R respectively. Voltage is impressed upon the diagonal input from the first secondary winding $S_1$ to the transformer T. A diagonal output is arranged across the junctions between the windings 56R and 57R and between the windings 58R and 59R respectively. A load in the form of a resistance $R_R$ is connected across the output. Similarly, the windings 56T, 57T, 58T, and 59T of the test accelerometer are connected as a "Wheatstone" bridge, having a diagonal input across the junctions between the windings 56T and 58T and between the windings 57T and 59T respectively. Voltage is impressed upon the diagonal input from the second secondary winding $S_2$ of the transformer T. Also similarly, a diagonal output is arranged across the junctions between the windings 56T and 57T and between the windings 58T and 59T respectively. A load in the form of a resistance $R_T$ is connected across the output diagonal.

The two load resistors $R_R$ and $R_T$ have values corresponding to those of the loads to which the outputs of the accelerometers are intended to be applied in practice. Likewise, the constants of the primary winding P and the secondary windings $S_1$ and $S_2$ of the transformer T are so chosen that the voltages impressed upon the inputs of the two accelerometers 50T and 50R are the same as those which are to be applied thereto when the accelerometers are in use. For simplicity in considering the invention, it is here assumed that the accelerometers have about equal sensitivities and that their other characteristics are nearly the same. It is also assumed that the outputs of the two accelerometers are nearly zero when the accelerometers are not being subjected to acceleration.

The windings 56T, 57T, 58T, and 59T and the windings 56R, 57R, 58R, and 59R of the two accelerometers are, of course, located on the spin plate 12 while the remainder of the electrical apparatus of Fig. 4 is located elsewhere. The windings are connected with the remainder of the electrical apparatus through the slip rings 66.

As the spin plate 12 rotates, centrifugal forces are applied to the accelerometers along their acceleration axes. Inasmuch as the two accelerometers are rigidly secured to the spin plate 12 and are located equi-distant from the center thereof, they are subjected to equal accelerations. This equality exists not only while the rotatable member is rotating at a constant speed but also at various times while the speed of the rotatable member is changing.

As the spin plate 12 rotates, the outputs of the two accelerometers are compared, this comparison being made at various speeds of rotation while the spin plate is brought up to its maximum speed from a stationary starting condition.

To make this comparison, the outputs of the two accelerometers 50T and 50R are applied to a subtraction circuit 72 which includes an input transformer 74 feeding an amplifier 76, the output of which is applied to an output transformer 78. More particularly, the outputs of the two transformers appearing across the two load resistors $R_R$ and $R_T$ are fed to opposite terminals of the primary winding 80 of the input transformer 74. As a result, the vector difference of the voltages appearing at the outputs of the accelerometers 50T and 50R is amplified, and appears across the secondary winding 82 of the output transformer 78. Various selected components of the vector difference are detected by means of a ring demodulator circuit 100.

The ring demodulator circuit 100 has two diagonal input circuits, one of which includes the secondary winding 82 of the output transformer 78 and the other of which includes the secondary winding 102 of another transformer 104. The ring demodulator also includes an output circuit including a potentiometer 106 that is connected across the center taps of the two secondary windings 82 and 102.

In order to detect and measure a selected component of the amplified vector difference voltage appearing across the secondary winding 82, a phase control circuit 108 is connected between the secondary winding S₃ of the main transformer T and the primary winding 110 of the transformer 104. The phase control circuit 108 illustrated includes a double-pole, double-throw switch 112 having two pairs of contactors 114 and 116, respectively. In a first position of the switch, the secondary winding S₃ is directly connected to the primary winding 110 through the pair of contactors 114. In a second position of the switch, the secondary winding S₃ is connected to the primary winding 110 through a phase-shift network 120.

The phase-shift network 120 is in the form of a lattice network including resistors 122 and capacitors 124 which are so proportioned relative to the frequency of the carrier wave as to shift the phase 90°. The voltage applied to the ring demodulator 100 by the transformer 104 is in phase with the carrier wave applied to the inputs of the two accelerometers 50T and 50R when the switch 112 is in the first position but is 90° out of phase therewith when the switch is in the second position. The voltage impressed by the phase control circuit on the ring demodulator circuit 100 generally exceeds the amplified vector difference voltage impressed thereon by a factor of about three or more. With this arrangement, a D. C. voltage is produced across the potentiometer 106 which is proportional to the component of the vector difference voltage which is in phase with the voltage applied to the ring demodulator by the transformer 104. Thus, with the phase control circuit shown, voltages may be produced across the potentiometer 106 which are proportional to one component or another of the vector difference voltage.

The output of the reference accelerometer 50R is amplified by means of an A. C. amplifier 126 and then applied to a demodulator 128. With this arrangement, a voltage is produced at the output of the demodulator 128 which is proportional to the output of the reference accelerometer 50R and hence approximately proportional to the acceleration to which the two accelerometers are subjected.

A function recorder 130 is employed to produce a record of the voltage appearing across the potentiometer 106 as a function of the output of the demodulator 128. This function recorder 130, which is of conventional type, is provided with one pair of input terminals 132 which are connected through a sliding contactor 134 to the potentiometer 106 and another pair of input terminals 136 which are connected to the output of the demodulator 128. Such a function recorder 130 may, for example, include means controlled by voltage applied at the input terminals 136 for moving a strip of paper 138 in one direction $x$—$x$ a distance proportional to the voltage impressed upon these input terminals and also means for simultaneously displacing a recording element in another direction $y$—$y$ a distance proportional to the voltage impressed on the input terminals 132.

In this way a record or graph is obtained on the strip of recording paper 138 which represents a plot of voltage differences as a function of acceleration. The voltage differences being represented as abscissae and the acceleration as ordinates. One such record may be made for each position of the switch 112, thus obtaining a complete set of data for determining the vector differences of the outputs of the two accelerometers 50R and 50T for various values of acceleration.

It will be understood, of course, that such graphs may be made while the acceleration is increasing or while the acceleration is decreasing.

In practice, the reference accelerometer 50R may have an output which deviates slightly from exact proportionality to acceleration. Knowing the voltage differences indicated on the graphs and knowing the deviations of the output of the reference accelerometer from direct proportionality, it is then a simple matter to compute the deviations of the readings of the test accelerometer 50T from direct proportionality.

In the discussion above, it has been assumed that the two accelerometers produce approximately equal outputs when subject to a given value of acceleration. If this condition does not exist and it is desired to compare the outputs accurately, the ratio of the load resistors $R_R$ and $R_T$ may be set at a suitable value. Thus, for example, if the sensitivity of the test accelerometer 50T is about half that of the reference accelerometer 50R, the use of a load resistor $R_T$ having a value about twice that of the load resistor $R_R$ would normalize the outputs. In this case in calibrating the test accelerometer 50T account is taken not only of the calibration of the reference accelerometer 50R and the data obtained with the function recorder 130, but also the ratio of the load resistors $R_T$ and $R_R$. The manner in which such computations are made will be obvious to those skilled in the art and are, therefore, not described in detail here.

If, for any reason, the two accelerometers are located at different radial distances from the center of the rotatable member 12, account may be taken of the fact that the accelerometers are subject to different accelerations by suitably proportioning the values of the load resistors $R_T$ and $R_R$.

In the description given above, it has been assumed that the two acceleration axes extend radially toward the center of the rotatable member 12. It is not necessary that this condition be maintained, it being sufficient if the acceleration axes are equally inclined relative to the axis of rotation. In other words, it is only necessary that the acceleration axes form the same angle with the radii extending to the center of the spin plate 12 from the pivot axes of the springs 54R and 54T of the two accelerometers. Thus, for example, if the acceleration axes are equally inclined at an acute angle relative to the axis of rotation then as the angular velocity or speed of rotation of the rotatable member 12 changes, each of the accelerometers is subject to a tangential component of acceleration as well as a radial component. The tangential component depends upon the angular acceleration of the spin plate and the radial component depends upon the angular velocity of the spin plate. In any such event, the two accelerometers are nevertheless subjected to the same acceleration and the records obtained with the function recorder 130 may be employed to obtain a correct calibration of the test accelerometer 50T.

It will also be noted that it has been assumed above that the pivot axes of the armatures 52R and 52T are both parallel to the axis X—X of rotation of the spin table. It is not necessary that this condition be maintained. The reason for this is that the only portion of the centrifugal force acting upon the inertia member mass 60 that affects either accelerometer is that component which is parallel to the radius extending through the pivot axis of the armature 52.

It is thus apparent that the spin table may be employed to calibrate an accelerometer readily, accurately, and rapidly by arranging the acceleration axes of the accelerometer tangentially as well as radially or in fact in any other direction transverse to the axis of rotation X—X of the spin plate so long as the two orientations are the same. It is sufficient that the test accelerometer and the reference accelerometer be subject to the effects of two acceleration fields which are related in some known manner and that the two fields be varied as a function of time and that the differences in the outputs be measured and correlated with measurements of one of the acceleration fields.

Figure 6:
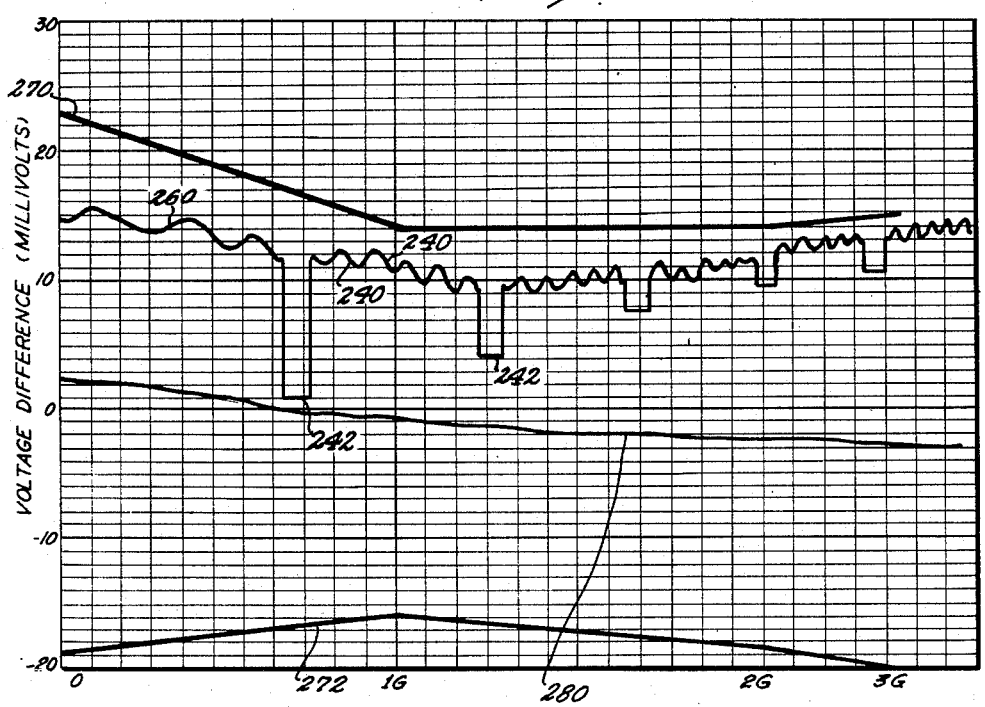
Fig. 6 is an enlarged view of a graph obtained with the apparatus of Fig. 5.
Figure 7:
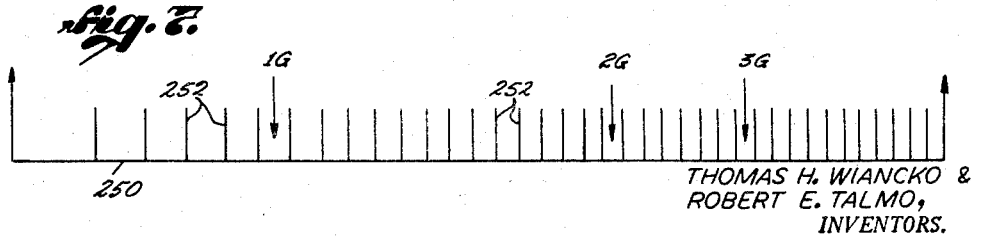
Fig. 7 represents a scale employed in the correlation of the graph of Fig. 6.

Another embodiment of the invention is illustrated in Figs. 5, 6, and 7. In this form of the invention, as in the foregoing, the output of the ring demodulator circuit 100 is employed to displace a recording element of a recorder 230. In this case the output of the ring demodulator 100 is first amplified by a variable gain amplifier 232. This recorder, however, is of the type in which a strip of paper 238 is driven at constant speed in one direction by a motor 239 while the deflections of the recording element in a transverse direction are being recorded.

One simple way to coordinate the output of the ring demodulator 100 with the acceleration when using this form of the invention is to tilt the base 22 slightly by manipulation of the leveling screws 44. When this is done, the apparent acceelration to which each of the accelerometers is subjected during the rotation of the member 12 varies with an amplitude equal to the component of gravity perpendicular to the axis of rotation of X—X. A record obtained with such an arrnagement is illustrated in Fig. 6. Here it will be noted that the graph recorded contains a plurality of wavy or sinuous segments 240 which represent variations in the vector difference voltage occurring as the member 12 rotates. The time interval between successive peaks of this record represents the period of rotation of the member 12. This time interval is readily determined from the spacing of the peaks on the recording paper, taking into account the speed of movement of the paper. In practice, as the record is being made, the gear head motor 40 is gradually increased to full speed and the recorder motor 239 is driven at constant speed. Then a scale 250, such as that shown in Fig. 7 calibrated to correspond with the speed of movement of the recording paper, is employed to determine the radial acceleration directly from the period, that is the spacing of peaks, of the recorded waves 240.

In one way of practicing the invention, the gear head motor 40 is accelerated in such a way that the radial acceleration increases at a uniform rate throughout the range of accelerations of interest. Above this range the rate of advance of radial acceleration decreases until a constant radial acceleration is obtained having a value about twenty-five (25%) percent higher than the highest value of radial acceleration in the test range. In another way of practicing the invention, the motor 40 is brought to maximum speed and then de-energized, permitting the speed of rotatable member 12 to decrease gradually. Obviously, the speed of rotation of the table may be changed in other ways to calibrate an accelerometer over a predetermined range.

The scale 250 includes a series of lines 252 spaced at variable intervals and values of acceleration corresponding to various intervals are printed on the scale. To determine the acceleration at any point on the graph of Fig. 6, it is only necessary to match the intervals on the scale with the intervals between successive peaks in the segments 240. The lengths of these intervals are simply related to the radial acceleration by the following equation:

$$a = \frac{4\pi^2 r}{T^2}$$

where $T$ = the period of the waves
$r$ = radial distance from axis X—X to the pivot axis of armature 52.

It is therefore a simple matter to calibrate the scale in terms of acceleration as indicated in Fig. 7. Then, by employing the scale as explained above the differences in output of the accelerometers may be correlated with the acceleration to which they are subjected. Thus, for example, the points of the record at which the ac- acceleration equals 1G, 2G, and 3G are shown at the bottom of the record.

By manipulating switch 112 during the recording, indications may be obtained of both in-phase or 0° component and the 90° component of the vector difference voltage. In a typical graph illustrated in Fig. 6, the main wavy segments 240 represent the in-phase components obtained while the switch is in its first position, while the other segments 242 represent the 90° components obtained while the switch is in its second position. Again, as mentioned before, knowing the calibration of the reference accelerometer 50R, the calibration of the test accelerometer 50T may be computed from the data on the record. In making such calibration, the voltage difference that would exist in the absence of the gravity component is employed. This difference is estimated by smoothing out the graph as indicated at 260 of Fig. 6.

The invention may be employed not only to calibrate an accelerometer accurately for different values of acceleration but also merely to determine whether the calibration lies within certain specified limits. In Fig. 6 for example, the broken lines 270 and 272 represent such limits drawn for a situation in which a test accelerometer is compared with a reference accelerometer having known deviations from linearity represented by the line 280. The lines 270, 272, and 280 refer to the in-phase component of the voltage difference and indicate that the test accelerometer meets the specifications.

The system for calibrating an accelerometer described above is applicable to angular accelerometers as well as linear accelerometers. Suppose, for example, the two accelerometers 50T and 50R are of the same design as that illustrated in Fig. 3 except that the rotating member, consisting of the armature 52 and the mass 60, is so balanced, such as by a counterweight on the opposite end from the mass 60, that the center of gravity of the system is located at the vertical axis of the accelerometer. Such a device would constitute an angular accelerometer and would be insensitive to linear accelerations. In this case, if the two angular accelerometers are arranged on the rotatable member 12 with their neutral, or pivot, axes parallel to the axis of rotation of the member 12, the two accelerometers will respond to angular acceleration of the member 12. The difference in outputs of the angular accelerometers would then be plotted by the function recorder 130 as a function of angular acceleration if the measuring system of Fig. 4 was employed.

It is not necessary to employ an angular accelerometer to detect the angular acceleration since this quantity may be detected in other ways. Thus, for example, if an angular accelerometer is to be calibrated, the reference accelerometer may be in the form of a linear accelerometer such as that shown in Fig. 3 provided that the acceleration axis is arranged tangentially on the spin plate 12. In this case as is well known, the angular acceleration of the member 12 is proportional to the linear acceleration to which the tangential linear accelerometer responds.

From the foregoing description, it will be clear that this invention provides a rapid method for accurately calibrating an accelerometer. While the invention has been described with particular reference to the employment of a rigid rotatable member and the mounting of two accelerometers on such a member, it will be clear that many of the advantages of the invention may be obtained even if the two accelerometers to be tested are subjected to accelerations produced in other ways so long as the accelerations are proportional or otherwise related in a known manner while they are varied. Various changes which will now suggest themselves to those skilled in the art, may be made in the material, form, details of construction, and arrangement of the elements, and also in the method of operation of the equipment, without departing from the principles of the invention. For example, other types of recorders may be employed utilizing other kinds of recording media and other methods may be employed to determine the rate of fluctuation of voltage differences that are caused by tilt of the spin table. Reference is, therefore, to be had to the appended claims to determine the scope of the invention.

The invention claimed is:

1. In a method of calibrating a test accelerometer, the steps which comprise: similarly orienting said test accelerometer and a reference accelerometer in two acceleration fields whereby said accelerometers produce outputs corresponding to the accelerations to which they are subjected, varying the strength of said acceleration fields as a function of time, maintaining the accelerations to which said accelerometers are subjected in a constant proportion as they are varied, measuring the difference between the outputs of said accelerometers as the acceleration fields are varied, measuring one of the acceleration fields, and correlating the measured differences between the outputs with the measured acceleration field.

2. In a method of calibrating a test accelerometer, the steps which comprise: similarly orienting said test accelerometer and a reference accelerometer respectively in two acceleration fields bearing a known relationship whereby said accelerometers produce outputs corresponding to the acceleration to which they are subjected, and measuring the difference between the outputs of said accelerometers.

3. In a method of calibrating a test linear accelerometer, the steps which comprise: revolving said test linear accelerometer and a reference linear accelerometer at the same angular velocity while maintaining their acceleration axes equally inclined to their respective radii of rotation whereby said accelerometers produce outputs corresponding to the acceleration to which they are subjected, and measuring the difference between the outputs of said accelerometers.

4. In a method of calibrating a test angular accelerometer, the steps which comprise: similarly orienting said test angular accelerometer and a reference angular accelerometer with their neutral axes parallel to an axis of rotation, angularly accelerating said angular accelerometers about the axis of rotation, whereby said accelerometers produce outputs corresponding to the angular acceleration to which they are subjected, and measuring the difference between the outputs of said accelerometers as the acceleration fields are varied.

5. In apparatus for calibrating a test accelerometer, a rigid rotatable member, means for mounting said test accelerometer and a reference accelerometer on said rotatable member at such positions that both of said accelerometers respond simultaneously to accelerational forces produced by rotation of said member, means for rotating said member, and differential output detection means simultaneously controlled by outputs of both said accelerometers for comparing the outputs of said accelerometers simultaneously produced by rotation of said member.

6. In apparatus for calibrating a test accelerometer, a rigid rotatable member, means for mounting said test accelerometer and a reference accelerometer on said rotatable member at such positions that both of said accelerometers respond simultaneously to accelerational forces produced by rotation of said member, said accelerometers producing at their outputs voltages which correspond to the acceleration to which they are subjected, means for rotating said member, and means including a subtraction circuit controlled jointly by the outputs of said accelerometers for comparing the outputs of said accelerometers during rotation.

7. In apparatus for calibrating a test accelerometer, a rigid rotatable member, means for mounting said test accelerometer and a reference accelerometer on said rotatable member at such positions that both of said accelerometers respond simultaneously to accelerational forces produced by rotation of said member, means for rotating said member, and differential output detection means simultaneously controlled by outputs of both of said accelerometers for indicating the difference between the outputs of said accelerometers during rotation.

8. In apparatus for calibrating a test accelerometer, a rigid rotatable member, means for mounting said test accelerometer and a reference accelerometer on said rotatable member at such positions that both of said accelerometers respond to accelerational forces simultaneously produced by rotation of said member, means for rotating said member, means for varying the speed of rotation of said member, a function recorder having first and second input terminals and adapted to record on a recording medium a voltage applied to said first input terminals as a function of a voltage applied to said second input terminals, means controlled by the output of one of said accelerometers for applying a first corresponding voltage to said first input terminals, and means controlled by the difference between the outputs of said accelerometers for applying a second corresponding voltage to said second input terminals.

9. In apparatus for calibrating a test linear accelerometer, a rigid member adapted to rotate about a predetermined axis of rotation, means for mounting said test linear accelerometer and a reference linear accelerometer on said member with their acceleration axes equally inclined relative to the axis of rotation, whereby such rotation simultaneously subjects both said accelerometers to equal non-radial accelerational forces, and differential output detection means simultaneously controlled by outputs of both of said accelerometers for measuring the difference of the outputs of said accelerometers produced by rotation of said member.

10. In apparatus for calibrating a test linear accelerometer, a rigid member adapted to rotate about a predetermined axis of rotation, means for mounting said test linear accelerometer and a reference linear accelerometer on said member simultaneously with their acceleration axes extending radially relative to the axis of rotation, and differential output detection means simultaneously controlled by outputs of both of said accelerometers for measuring the difference in the outputs of said accelerometers produced by rotation of said member.

11. In apparatus for calibrating a test linear accelerometer, a rigid member adapted to rotate about a predetermined axis of rotation, means for mounting said test linear accelerometer and a reference linear accelerometer on said member simultaneously with their acceleration axes extending radially relative to the axis of rotation, means for measuring the difference in the outputs of said accelerometers produced by rotation of said member, and differential output detection means simultaneously controlled by outputs of both of said accelerometers for indicating the angular velocity of said member that corresponds to said difference.

12. In apparatus for calibrating a test linear accelerometer, a rigid member adapted to rotate about a predetermined axis of rotation that is tilted slightly relative to a horizontal plane, means for mounting said test linear accelerometer and a reference linear accelerometer on said member at angularly spaced positions with their acceleration axes extending radially relative to the axis of rotation, means for varying the speed of rotation of said member gradually, means for measuring the difference in the outputs of said accelerometers during rotation of said member, and means for indicating the rate of fluctuation of said difference as the speed of rotation varies to provide an indication of the angular velocity of said member.

13. In apparatus for calibrating a test linear accelerometer, a rigid member adapted to rotate about a predetermined axis of rotation, means for mounting said test linear accelerometer and a reference linear accelerometer on said member with their accleration axes equally inclined relative to the axis of rotation, a function recorder having first and second input terminals and adapted to record on a recording medium a voltage applied to said first input terminals as a function of a voltage applied to said second input terminals, means controlled by the output of one of said accelerometers for applying a first corresponding voltage to said first input terminals, and means controlled by the difference between the outputs of said accelerometers for applying a second corresponding voltage to said second input terminals.

14. In apparatus for calibrating a test angular accelerometer, a rigid member adapted to rotate about a predetermined axis of rotation, means for mounting said angular accelerometer on said rotatable member with its neutral axis parallel to said rotation axis, means for mounting a linear accelerometer on said member with its acceleration axis tangentially arranged relative to said rotation axis, means for rotating said member, and means for comparing the outputs of said accelerometers during rotation of said member.

15. In apparatus for calibrating a test accelerometer, a rigid rotatable member, means for mounting said test accelerometer and a reference accelerometer on said rotatable member at such positions that said accelerometers respond to accelerational forces produced by rotation of said member, both of said accelerometers being of the carrier wave type and each of said accelerometers comprising an input circuit and an output circuit, means for impressing a carrier wave in the same phase relationship on said input circuits, a subtraction circuit connected to said output circuit for producing a voltage equal to the vector difference between the voltages appearing at the outputs of said accelerometers, and means for indicating the magnitude of the component of said vector difference voltage that bears a specified phase relationship to the carrier wave voltage impressed on said input circuits.

16. In apparatus for calibrating a test accelerometer, a rigid rotatable member, means for mounting said test accelerometer and a reference accelerometer on said rotatable member at such positions that said accelerometers respond to accelerational forces produced by rotation of said member, both of said accelerometers being of the carrier wave type and each of said accelerometers comprising an input circuit and an output circuit, means for impressing a carrier wave in the same phase relationship on said input circuits, a subtraction circuit connected to said output circuits for producing a voltage equal to the vector difference between the voltages appearing at the outputs of said accelerometers, a ring demodulator having a pair of diagonal input circuits and an output circuit, means for impressing a carrier wave on one of said diagonal input circuits, means for impressing said vector difference voltage on the other of said diagonal input circuits, and means connected to said demodulator output circuit for indicating the magnitude of the component of said vector difference voltage that is in phase with the carrier wave voltage impressed on said one diagonal input circuit.

17. In apparatus for calibrating a test accelerometer, a rigid rotatable member, means for mounting said test accelerometer and a reference accelerometer on said rotatable member at such positions that said accelerometers respond to accelerational forces produced by rotation of said member, both of said accelerometers being of the carrier wave type and each of said accelerometers comprising an input circuit and an output circuit, means for impressing a carrier wave in the same phase relationship on said input circuits, a subtraction circuit connected to said output circuits for producing a voltage equal to the vector difference between the voltages appearing at the outputs of said accelerometers, a ring demodulator having a pair of diagonal input circuits and an output circuit, means for selectively impressing a carrier wave in different phase relations on one of said diagonal input circuits, means for impressing said vector difference voltage on the other of said diagonal input circuits, and means connected to said demodulator output circuit for indicating the magnitude of the component of said vector difference voltage that is in phase with the carrier wave voltage impressed on said one diagonal input circuit.

18. In apparatus for calibrating a test accelerometer, a rigid rotatable member, means for mounting said test accelerometer and a reference accelerometer on said rotatable member on opposite sides of the axis thereof in counter-balancing relationship whereby said accelerometers respond simultaneously to accelerational forces produced by rotation of said member, means for rotating said member, and means for comparing the outputs of said accelerometers simultaneously produced by rotation of said member.

19. In apparatus for calibrating a test linear accelerometer, a rigid member adapted to rotate about a predetermined axis of rotation that is tilted slightly relative to a horizontal plane, means for mounting said test linear accelerometer and a reference linear accelerometer on said member on opposite sides of the axis of rotation with their acceleration axes extending radially relative to the axis of rotation, means for varying the speed of rotation of said member gradually, differential output detection means controlled by the outputs of both of said accelerometers for measuring the difference in the outputs of said accelerometers during rotation of said member, and means for indicating the rate of fluctuation of said difference as the speed of rotation varies to provide an indication of the angular velocity of said member.

20. In apparatus for calibrating a test accelerometer, a rigid rotatable member, means for mounting said test accelerometer and a reference accelerometer on said rotatable member at such positions that both of said accelerometers respond simultaneously to accelerational forces produced by rotation of said member, said accelerometers producing at their outputs voltages which correspond to the acceleration to which they are subjected, means for rotating said member, and means connected to said outputs for detecting and indicating the differences between said voltages.

21. In apparatus for calibrating a test accelerometer, a rigid member secured to a power-driven shaft rotatable on a support member; means for mounting said test accelerometer and a reference accelerometer on said rigid member on opposite sides of said shaft in counter-balancing relationship; slip rings on said shaft and brushes on said support member; and electrical conductors leading from said slip rings to the positions of said accelerometers.

22. In apparatus for calibrating a test accelerometer, a rigid member secured to a power-driven shaft rotatable on a support member; means for mounting said test accelerometer and a reference accelerometer on said rigid member on opposite sides of said shaft in counter-balancing relationship; slip rings on said shaft and brushes on said support member; electrical conductors leading from said slip rings to the positions of said accelerometers; and means connected to said brushes for indicating the difference in the outputs of said accelerometers.

23. In apparatus for calibrating a test accelerometer, a rigid member secured to a power-driven shaft rotatable on a support member; means for mounting said test accelerometer and a reference accelerometer on said rigid member on opposite sides of said shaft in counter-balancing relationship; slip rings on said shaft and brushes on said support member for making electrical connections between said accelerometers at said positions; and stationary output difference measuring means connected to said accelerometers through said slip rings and brushes.

References Cited in the file of this patent

UNITED STATES PATENTS 1,175,222   Blakeslee _____ Mar. 14, 1916

OTHER REFERENCES

The Genisco "G" Accelerator Advertising Pamphlet. From Genisco Incorporated, 2233 Federal Avenue, Los Angeles 64, California.